O. L. DOSCH.
POLISHING MACHINE.
APPLICATION FILED SEPT. 15, 1910.
1,020,946.
Patented Mar. 19, 1912.
2 SHEETS—SHEET 1.
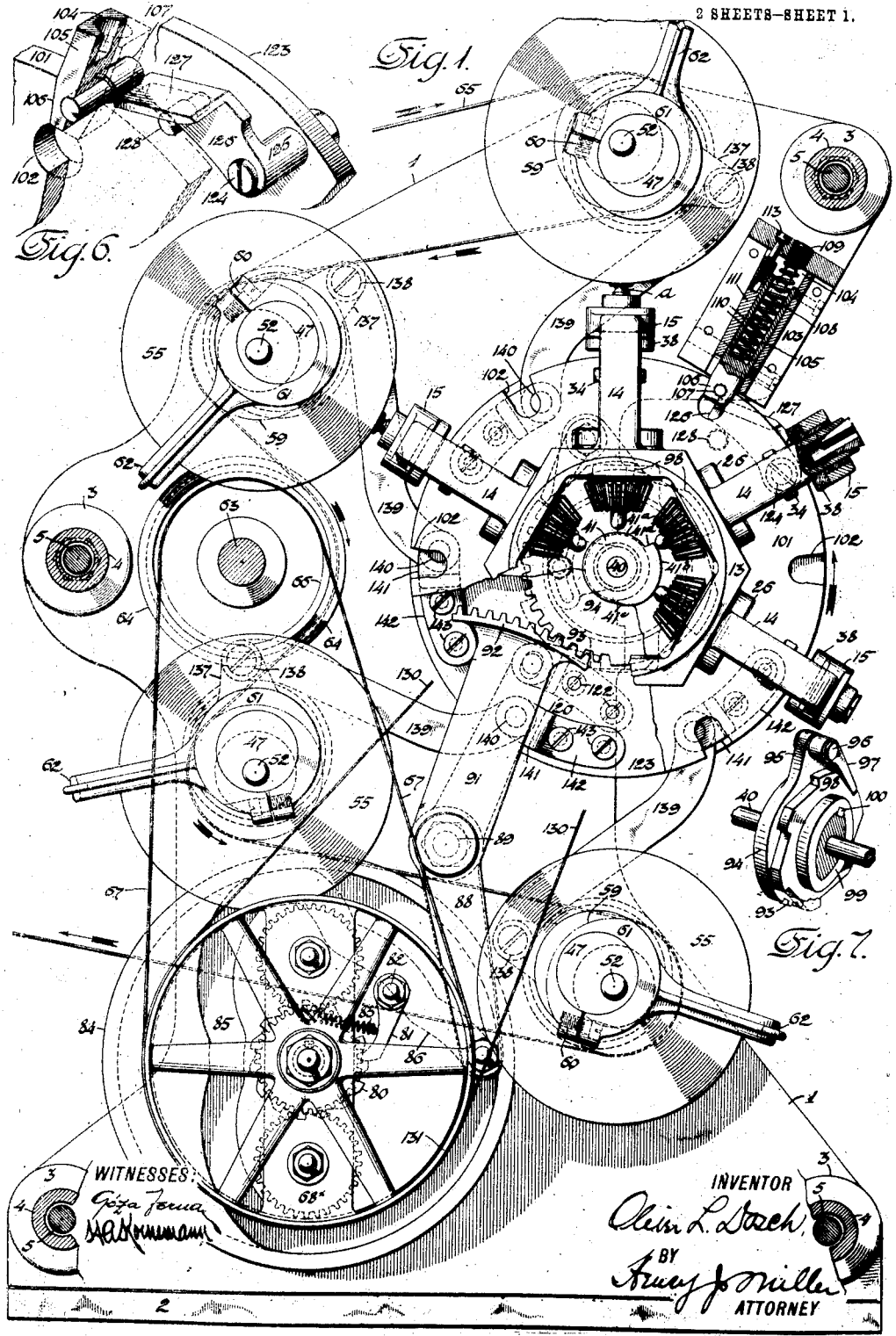

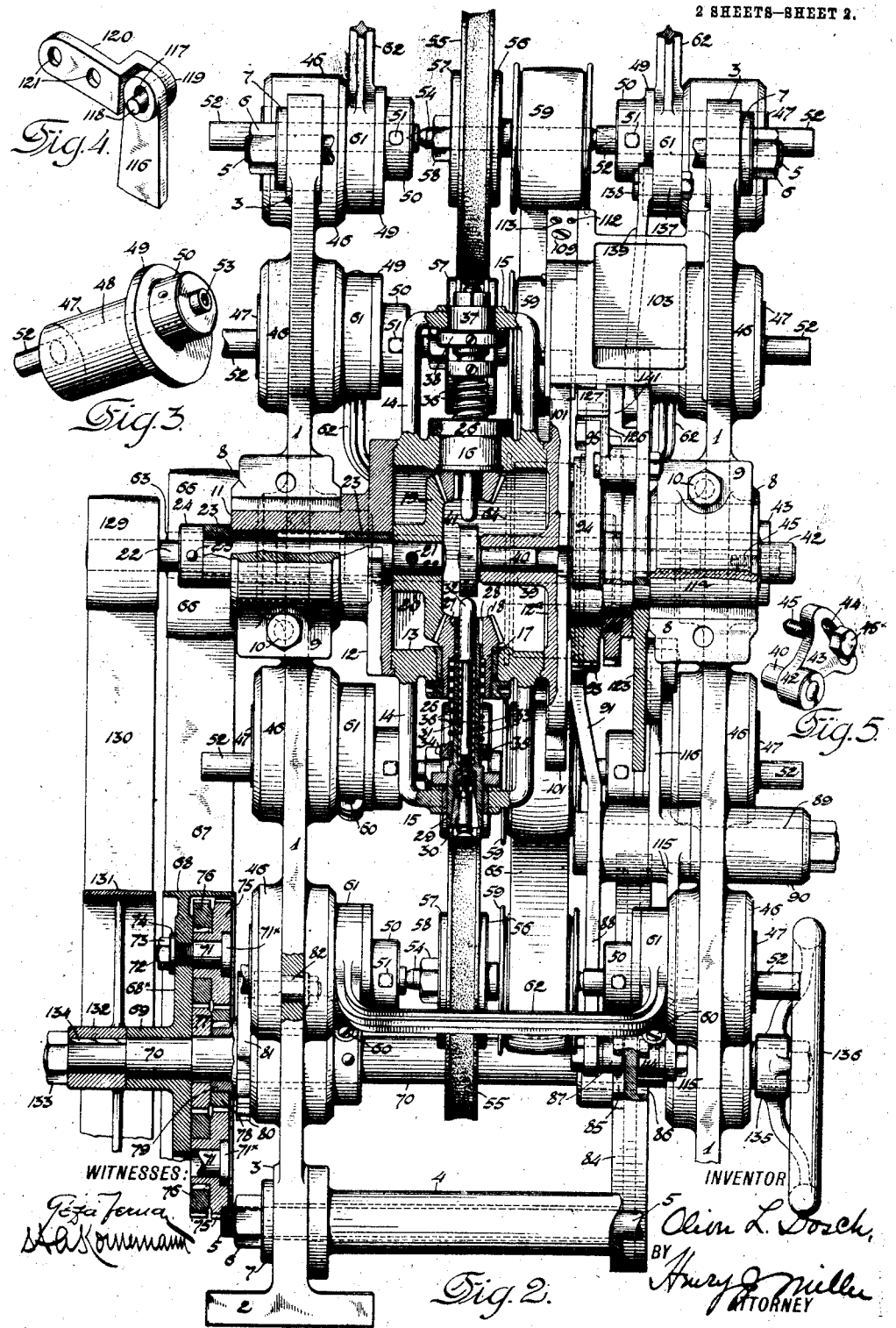

UNITED STATES PATENT OFFICE.

OLIVER L. DOSCH, OF ELIZABETH, NEW JERSEY, ASSIGNOR TO THE SINGER MANUFACTURING COMPANY, A CORPORATION OF NEW JERSEY.

POLISHING-MACHINE.

1,020,946.   Specification of Letters Patent.   Patented Mar. 19, 1912.

Application filed September 15, 1910. Serial No. 582,170.

*To all whom it may concern:*

Be it known that I, OLIVER L. DOSCH, a citizen of the United States, residing at Elizabeth, in the county of Union and State of New Jersey, have invented certain new and useful Improvements in Polishing-Machines, of which the following is a specification, reference being had therein to the accompanying drawings.

This invention relates to an improvement in automatic machines for grinding or polishing the heads of screws and other articles, and it has for its object to provide a simple and effective mechanism for performing the work required.

In accordance with the present invention the machine is constructed with a frame in which is journaled a rotary turret carrying a plurality of radially arranged chucks and concentrically arranged with the axis of motion of said turret is a series of rotary spindles each carrying an abrading wheel adapted to operate successively upon the articles mounted within said chucks. The abrading-wheel spindles are provided with pulleys embraced by a common driving belt from the source of power which also embraces a driving wheel operatively connected with the feeding mechanism for imparting the requisite step-by-step motions of the turret and with mechanism for rotating the several chucks upon their supporting turret. Means are provided for automatically clamping the articles to be operated upon within their respective chucks and for successively releasing the same after the work is finished.

The present improvement includes various constructive features contributing to the effectiveness and certainty of action of the various parts of the mechanism.

In the accompanying drawings, Figure 1 is a side elevation partly in section, of a machine embodying the present invention; and Fig. 2 an end elevation of a machine also partly in section. Fig. 3 is a perspective view of one of the abrading-wheel spindle bushings. Fig. 4 is a perspective view representing a part of the mechanism for releasing the turret preparatory to an advance movement thereof from one polishing station to the next. Fig. 5 is a detail perspective view of the adjusting means for the cam for controlling the engagement of the chucks with the articles to be polished. Fig. 6 is a perspective view, partly in section, of another portion of the turret releasing means, and Fig. 7 is a detail perspective view of a portion of the turret feeding mechanism.

The frame of the machine is constructed with upright standards 1 in the form of flat plates of somewhat irregular shape, with feet 2 and perforated bosses 3 secured together by means of the tubular brace members 4 and tie-bolts 5 each provided at opposite ends with a nut 6 seated upon the washer 7. Each of the standards is provided with a bearing boss 8 having a cap 9 secured thereon by screw 10 in which are journaled hollow bosses 11 and 11$^x$ of the end caps 12 and 12$^a$ of the turret which is shown herein formed with a hollow hexagonal body 13 having extending radially from its outer faces the yokes 14 affording bearing bosses 15 for the chucks. The body 13 of the turret is formed with apertures in alinement with the bearing bosses 15 of the yokes 14, provided with bushing 16 having journaled therein the tubular hubs 17 of the bevel-pinions 18 meshing with a common driving bevel wheel 19 whose hub 20 is secured by means of the pin 21 upon one end of a shaft 22 journaled in bushings 23 within one of the tubular hubs 11 of the turret and locked against endwise movement in said bushings by means of the collar 24 secured by a pin 25 upon said shaft. To the threaded outer ends of the bevel-pinion hubs 17 are applied the internally threaded thrust-collars 26 for insuring against the endwise movement of the pinions.

Each of the work-holding chucks comprises a tubular spindle 27 slidingly fitted within the bore of its respective bevel-wheel hub and locked against turning therein by means of a spline 28. The outer end of its shank is enlarged to form a head 29 having a cylindrical exterior face and an outwardly flaring interior face to which latter is fitted the correspondingly shaped split work-holding member 30 affording a series of relatively yielding work-holding jaws providing a socket to receive the shank of the screw or other article whose outer end or head is to be ground or polished. The inner end of the work-holding plug or member 30 has an axially threaded aperture in which is secured the correspondingly threaded stem 31 whose enlarged inner end portion 32 is fitted slidingly within the bore of and splined to the tubular spindle 27 and is rounded at its extremity.

Between the shoulder of the stem 31 afforded by the enlargement 32 and the chuck-spindle head 29 is interposed a spring 33 acting to normally force the stem 31 inwardly to close the chuck upon the work; and between a thrust-collar 34 adjustably secured by means of the set-screw 35 upon the spindle 27 and the inner end of a socket in the bevel-wheel hub 17 surrounding the spindle 27 is interposed a stronger spring 36 tending to force outwardly the tubular shank and the work-clamping parts carried thereby. To the enlarged outer end portion or head 29 of the spindle 30 is adjustably secured by means of a set-screw 37 a stop-collar 38 which serves to limit the outward movement of the chuck under the action of the spring 36.

The cap 12$^a$ of the turret is formed with an inwardly extending bearing hub 39 in which and in the oppositely extending bearing boss is journaled the cam-spindle 40 disposed in substantial alinement with the shaft 22 and carrying the substantially snail-shaped chuck-release cam 41 in alinement with the several convergently arranged stems 31, said shaft having fixed upon its opposite end the hub 42 of an arm 43 having a segmental slot 44 entered by the threaded shank 45 of a tap-bolt screwed into the bearing boss 8 and adapted to clamp the arm 43 between its head 45$^x$ and said bearing boss in different angular positions for the required circular adjustment of the cam 41. As will be seen by reference to Fig. 1, the cam 41 has an inner or lower concentric portion 41$^a$ extending through an arc of considerably more than a half circle, and a concentric high portion 41$^b$ covering an arc of about 60°; the former being of such diameter as to clear the rounded inner extremities of the chuck-stems 31, while the diameter of the concentric portion 41$^b$ is considerably greater so as to engage and hold the extremities of the chuck-stems outwardly in chuck-releasing position. The inclined portion 41$^c$ intermediate the concentric lower and higher cam portions operates in the rotation of the turret around the cam to gradually engage and press the chuck-stems successively outward, and the abrupt shoulder 41$^d$ insures the abrupt release of the stems 31 to enable the chuck to clamp the work in position under the action of the spring 33.

The standards 1 are further provided with alined bearing bosses 46 disposed in substantially circular arcs concentric with the axis of the shaft 22, and each of said bosses is provided with a bushing 47 having an eccentric longitudinal bearing aperture 48, with a flange 49 near one end carrying a boss 50 concentric with the bearing aperture. Adjustably secured in the eccentric aperture of each bushing 47, by means of the set-screw 51, is a bar 52 having in the end adjacent the boss 50 a conical aperture 53 adapted to be entered each by a conical end of the polishing-wheel spindle 54 carrying the abrading or polishing wheel 55 clamped thereon against the flange 56 by means of a disk 57 and a nut 58 applied to the adjacent threaded end portion of the spindle. As indicated in Fig. 2, each of the abrading wheels 55 is arranged in the plane of the several chuck-spindles, and its abrading portion is slightly concaved or shaped to fit the adjacent end of the article to be operated upon. Upon each of the spindles 54 adjacent its abrading wheel is fixed a flanged belt-pulley 59. Upon each of the alined bushings of each pair, intermediate the flange 49 and its respective bearing boss 46, is adjustably clamped by means of the screw 60 a strap 61 at one extremity of the yoke 62, the turning of which by the attendant will serve to shift the eccentrically arranged center-bars 52 for the spindles 54 nearer to or farther from the turret, as may be desired for different classes of work.

Suitably journaled in the machine frame parallel with the axis of motion of the turret is the driving shaft 63 from which are derived the feeding movements of the turret and the rotary motions of the chucks carried thereby. This shaft has fixed thereon the flanged belt-pulley 64. The driving belt 65 from a suitable pulley at the source of power is led over and around the upper abrading wheel-pulley 59, thence over and around the adjacent abrading wheel pulley, around the fixed pulley 64 on the driving shaft 63 and thence successively around the two lower abrading-wheel pulleys 59 and back to the pulley at the source of power, whereby each of the abrading wheels is actuated directly by a common transmitting member from the source of power from which the driving shaft 63 is driven. The driving shaft 63 carries a second pulley 66 operatively connected by means of the belt 67 with a pulley 68 having its head 69 loosely mounted upon the cam-shaft 70 journaled in suitable bearings provided therefor in the frame-standards 1. The automatically arranged web 68$^x$ of the pulley 68 carries two shouldered studs 71 to whose reduced threaded ends 72 are applied the nuts 73 and washers 74, and to whose larger ends are fitted the loose pinions 75 confined thereon by the heads 71$^x$ and having fixed upon their hubs the pinions 76 meshing with the gear-wheel 77 keyed upon the cam-shaft 70. Meshing with the pinions 75 is an intermediate pinion 78 which is fitted to and keyed upon the hub 79 of a ratchet-wheel 80 loosely mounted upon the cam-shaft 70 and normally held from rotation by means of a pawl 81 pivotally mounted upon a stud 82 secured in the web of the standard 1, the point of said pawl being normally maintained in contact with the teeth of the ratchet-wheel 80 by means of a spring 83 having one end connected with said pawl and the other end attached to the standard 1.

The train of gearing just described constitutes a planet mechanism affording a speed-reducing device between the driving shaft 63 and the cam-shaft 70, but it will be evident that when the pawl 81 is disengaged from the ratchet-wheel 80, so that the latter is permitted to rotate with the pulley 68 and the pinions carried thereby, the operative relation between the driving shaft and the cam-shaft will be interrupted and the latter will cease to rotate.

Upon the cam-shaft 70 is fixed the cam-disk 84 provided in the face nearest the pulley 68 with a feed-actuating cam-groove 85 and in the opposite face with a turret-release actuating cam-groove 86. The cam-groove 85 is entered by a roller-stud 87 carried by the depending arm 88 of a rock-lever mounted upon a fulcrum-stud 89 secured in a perforated boss 90 of the adjacent frame-standard 1, said rock-lever having an upwardly extending arm 91 carrying at its upper end a segmental rack 92 meshing with a segmental series of gear-teeth 93 upon one side of a disk 94 which is loosely mounted upon an enlargement of the boss 11$^a$ of the turret and provided with a projecting lug 95 carrying a stud-pin 96 upon which is mounted a feed-pawl 97 whose operative end engages the teeth of a 6-toothed ratchet-wheel 98 having its hub 99 secured by means of the key 100 upon a second enlargement of the boss 11$^a$ of the turret. The proportions of the parts are such that each rotation of the cam-wheel 84 causes the vibration of the rock-lever 88 91 through an angle sufficient to impart an advance movement of 60° to the turret and a dwell of the same during the retraction of the pawl 97 and subsequent inaction of the feed-actuating rock-lever until the succeeding actuation of the latter.

To prevent the overthrow or retrograde movement of the turret under the action of its feeding or advancing mechanism and to insure the accurate register of each chuck-spindle with its respective polishing wheel at the several polishing stations a locking device is employed. This consists of a circular index-plate 101 shown herein integral with the cap 12$^a$ of the turret and provided with a series of flaring peripheral notches 102 corresponding in number and peripheral spacing with the chuck-spindles 27. Secured to the nearer standard 1 is a bracket 103 formed with a socket 104 in radial relation with the disk 101 and in which is slidingly fitted the bolt 105 formed with tapered operative end 106 carrying a laterally projecting stud 107. The bolt is formed with a longitudinal socket 108 between the bottom of which and an adjacent screw-pin 109 carried by the bracket is interposed a spring 110 adapted to press the bolt normally toward the disk 101 and into the notches 102 therein. One side of the socket 104 is inclined to the parallel-sided bolt 105 to receive an adjusting wedge 111 adjustably secured in position in a wellknown manner by means of push- and pull-screws 112 and 113, the latter only of which is shown in the sectional representation in Fig. 1. As the wedge-shaped end 106 of the bolt 105 is maintained by the spring 110 normally in engagement with one of the notches 102 of the locking disk 101, so as to maintain the turret locked against either advance or retrograde movement, means are provided for periodically disengaging the locking bolt from the peripherally notched disk preparatory to the actuation of the feeding mechanism for imparting an advance movement to the turret. The groove 86 of the cam-disk 84 is entered by a roller-stud 114 carried by the depending arm 115 of a rock-lever also fulcrumed upon the stud 89 and having an upwardly extending arm 116 formed with an elongated eye 117 which is entered by a lateral pin 118 upon the offset ear 119 of the bracket-piece 120 with apertures 121 entered by fastening screws 122 by which it is secured to a circular plate 123 loosely mounted upon the reduced portion of the turret hub 11$^a$ whose adjacent portion is journaled in the bearing boss 8 of the standard 1. The rocking plate 123 carries a lateral fulcrum-stud 124 upon which is journaled the hub 125 of the bolt-retractor arm 126 which is formed with a lateral lifting plate 127 having parallel upper and lower faces, the arm 126 being sustained upon its fulcrum-stud 124 by means of a stop-pin 128 projecting from the adjacent face of the plate 123 and upon which the lower edge of the arm 126 normally rests.

In the normal position of the parts represented in Figs. 1 and 6, the forward end of the upper face of the lifting plate 127 is disposed slightly beneath the roller-stud 107 of the bolt 105, and the plate 127 is arranged at an inclination with the circumference of the plate 123. As the lifting plate moves forward under the action of the cam-groove 86 and the connecting train of mechanism, the inclined plate 127 acts upon the stud 107 to retract the bolt 105 in opposition to its spring 110, but as the plate has a somewhat longer range of operative movement than its length, the stud 106 rides off the rearward end of the lifting plate and permits the bolt under the action of its spring to assume contact relation with the circular periphery of the index-plate 101, while the retrograde movement of the rocking plate 123 causes the lower face of the lifting plate 127 to ride up over the stud 107 without affecting the position of the same. As the action of the feeding mechanism, begun during the retraction of the bolt 105, is completed, to bring a succeeding notch 102 of the index-plate 101 into register with the nose 106 of the bolt 105, the latter enters the notch under the action of its spring 110 and locks the index-plate with the attached turret in the required position.

In order to rotate the chuck-spindles upon the turret, the shaft 22 carrying the bevel-wheel 19, constituting a common driving member for the several bevel pinions 18, has fixed thereon the pulley 129 which is connected by means of a belt 130 with a larger pulley 131 having its hub 132 fixed upon the reduced and threaded end portion of the cam-shaft 70 by means of the clamp-nut 133 and the key 134. Upon the opposite end of the cam-shaft is secured by similar means the hub 135 of a hand-wheel 136 by means of which the cam-shaft may be turned by hand when the pawl 81 is disengaged from the ratchet-wheel 180.

Preparatory to the advance of the turret from one operative station to the next to carry the work from operative relation with one abrading wheel 55 to the next, it is desirable that the abrading wheel be retracted so that the work will be presented only in substantial radial relation with the abrading wheels. To this end, one of the straps 61 of each of the yokes 62 is provided with a projecting lug 137 to which is connected by means of the bolt 138 one end of a bent link 139 whose opposite end is provided with an eye entered by a pin 140 upon the offset ear 141 of the bracket-piece 142 secured by fastening screws 143 upon the rocking plate 123. When the plate 123 is rocked to operate the bolt-lifting means preparatory to a feeding operation, the several yokes 62 are turned by their described connections with the rocking plate 123, so as to laterally shift the eccentrically disposed center-bars 52 journaled in the bushings 47 and thereby retract the abrading wheels 55 during the feeding of the turret between stations, the return of the rocking plate to initial position serving to restore the abrading wheels to inital operative relation with the turret. In certain classes of work, these connections between the yokes 62 and the rocking plate 123 may be dispensed with, although desirable in certain other conditions. It will be observed that by loosening the clamp-screws 60, the position of the straps upon the bushings 47 may be independently adjusted to determine the operative relation of the abrading wheels 55 to the chucks without affecting the simultaneous retraction of the abrading wheels during the movements of the turret.

In the operation of the machine, the mechanism having been set in motion, the attendant is stationed at the right (Fig. 2) and successively introduces in the open chuck nearest the locking bolt 105 the shanks of the articles $a$ to be operated upon. In the succeeding feeding action of the turret, the end of the enlargement 32 of the stem 31 of the inner chuck member drops off the shoulder at $41^d$ of the release cam 41, whereby the spring 33 acts to draw inwardly the chuck member 30 and clamp the body of the article firmly in position which it maintains while passing through the several stations adjacent the abrading wheels 55. In passing from the last operative station above the lower abrading wheel, the member 32 rides up the cam incline $41^c$ to the concentric higher portion $41^b$, and is forced outwardly in opposition to the spring 33 so as to release the article operated upon, which is permitted to fall by gravity from a position below the center of the axis of movement of the turret into a suitable receptacle provided beneath the same. The object of the spring 36, as will be obvious, is to force the chuck bodily outward to maintain it in yielding contact with the abrading wheels.

Having thus set forth the nature of the invention, what I claim herein is:—

1. A machine of the class described comprising a rotary turret, a plurality of radially arranged chucks carried thereby, a plurality of abrading wheels arranged concentric with the axis of motion of said turret, means for simultaneously adjusting said abrading wheels toward and from said turret, pulleys connected with said abrading wheels, and a common belt connection from the source of power embracing said pulleys for imparting rotary motion to the abrading wheels.

2. A machine of the class described comprising a rotary turret, a plurality of radially arranged chucks carried thereby, a plurality of abrading wheels arranged concentric with the axis of motion of said turret, means for independently adjusting said abrading wheels toward and from said turret, means for simultaneously adjusting said abrading wheels relatively to said turret, pulleys connected with said abrading wheels, and a common belt connection from the source of power embracing said pulleys for imparting rotary motion to the abrading wheels.

3. A machine of the class described comprising a rotary turret, a plurality of radially arranged chucks carried thereby, feeding means for imparting step-by-step rotary movements to said turret, a plurality of abrading wheels arranged concentric with the axis of motion of said turret, pulleys connected with said abrading wheels and with the turret feeding means, and a common belt connection from the source of power embracing said pulleys.

4. A machine of the class described comprising a rotary turret, a plurality of radially arranged chucks carried thereby, feeding means for imparting step-by-step rotary movements to said turret, means for imparting rotating movements to said chucks independently of the movements of the turret, a plurality of abrading wheels arranged concentric with the axis of motion of said turret, pulleys connected with said abrading wheels and with the turret feeding means, and a common belt connection from the source of power embracing said pulleys.

5. A machine of the class described comprising a rotary turret, a plurality of radially arranged chucks carried by said turret, an abrading wheel arranged adjacent said turret, means for rotating said abrading wheel, feeding means for imparting step-by-step rotary movements to said turret, locking means for restraining the movement of said turret intermediate the actuations of said feeding means, and releasing means independent of the turret actuating means for disengaging the locking means from said turret preparatory to each advance of the latter.

6. A machine of the class described comprising a rotary turret, a plurality of radially arranged chucks carried by said turret, an abrading wheel arranged adjacent said turret, means for rotating said abrading wheel, feeding means for imparting step-by-step rotary movements to said turret, locking means for restraining the movement of said turret intermediate the actuations of said feeding means, releasing means for the turret locking means, a cam, an operative connection between said cam and said feeding means, and an independent operative connection between said cam and said releasing means.

7. A machine of the class described comprising a rotary turret provided with a series of circularly arranged sockets, a plurality of radially arranged chucks carried by said turret, an abrading wheel arranged adjacent said turret, means for rotating said abrading wheel, feeding means for imparting step-by-step rotary movements to said turret, a spring-pressed locking bolt adapted to successively enter said sockets of the turret, and means independent of the turret feeding means and acting upon said bolt to disengage the same from the turret preparatory to each actuation of the latter.

8. A machine of the class described comprising a rotary turret provided with a series of circularly arranged sockets, a plurality of radially arranged chucks carried by said turret, an abrading wheel arranged adjacent said turret, means for rotating said abrading wheel, feeding means for imparting step-by-step rotary movements to said turret, a spring-pressed locking bolt provided with a lateral shoulder and adapted to successively enter said sockets of the turret, a reciprocating carrier, means independent of said feeding means for actuating the same, and a bolt-retractor pivotally mounted upon said carrier and having substantially parallel operative faces inclined to the direction of movement of said carrier and adapted to alternately engage the lateral shoulder of said bolt.

9. A machine of the class described comprising a rotary turret provided with a series of circularly arranged sockets, a plurality of radially arranged chucks carried by said turret, an abrading wheel arranged adjacent said turret, means for rotating said abrading wheel, an actuating cam, means for driving the same, a clutch device including a driven member connected with said turret, and an oscillatory driving member, a rock-lever operatively connected with said cam and with the oscillatory driving clutch member, a locking bolt provided with a lateral shoulder and adapted to successively enter said sockets of the turret, a rocking carrier, a rock-lever operatively connected with said cam and with said carrier, and a bolt-retractor pivotally mounted upon said carrier and having substantially parallel operative faces inclined to the direction of movement of said carrier and adapted to alternately engage the lateral shoulder of said bolt.

10. A machine of the class described comprising a rotary turret, a plurality of radially arranged chucks mounted therein for movement toward and from the axis of rotation of the turret and each including a plurality of work-holding jaws and a spring-pressed spindle whereby they are clamped upon the work, a spring for forcing said chucks bodily outward from said axis of rotation, means for imparting step-by-step rotary movements to said turret, an abrading wheel, means for rotating the same, and a releasing cam adapted for successive engagement with the chuck spindles for opening each chuck to release the work.

In testimony whereof, I have signed my name to this specification, in the presence of two subscribing witnesses.

OLIVER L. DOSCH.

Witnesses:
HENRY J. MILLER,
H. A. KORNEMANN, Jr.